United States Patent
Ohashi et al.

(10) Patent No.: US 8,592,027 B2
(45) Date of Patent: Nov. 26, 2013

(54) INK COMPOSITION AND PRINTED ARTICLE

(75) Inventors: Masakazu Ohashi, Matsumoto (JP); Mayumi Hamada, Chino (JP)

(73) Assignee: Seiko Epson Corporation, Tokyo (JP)

( * ) Notice: Subject to any disclaimer, the term of this patent is extended or adjusted under 35 U.S.C. 154(b) by 223 days.

(21) Appl. No.: 13/207,617

(22) Filed: Aug. 11, 2011

(65) Prior Publication Data
US 2012/0040156 A1 Feb. 16, 2012

(30) Foreign Application Priority Data
Aug. 12, 2010 (JP) ................................ 2010-180866

(51) Int. Cl.
*B32B 3/10* (2006.01)
*C09D 11/12* (2006.01)

(52) U.S. Cl.
USPC ................ 428/207; 106/31.62; 106/31.63; 106/31.9

(58) Field of Classification Search
USPC ........................................ 106/31.62, 31.63
See application file for complete search history.

(56) References Cited

U.S. PATENT DOCUMENTS
2010/0086692 A1* 4/2010 Ohta ............................ 427/256

FOREIGN PATENT DOCUMENTS
JP 2007-297423 A 11/2007

OTHER PUBLICATIONS
Machine translation of JP 2003-292836 A (Oct. 15, 2003).*

* cited by examiner

*Primary Examiner* — Vu A Nguyen
(74) *Attorney, Agent, or Firm* — Nutter McClennen & Fish LLP; John J. Penny, V

(57) ABSTRACT

An ink composition which can be used to form an image having excellent metallic luster and excellent abrasion resistance is provided, and a printed article in which the image having excellent metallic luster and excellent abrasion resistance is formed is provided. Such an ink composition is ejected by an ink jet technique and contains silver particles, wax particles, and water. The wax particles are contained in an amount that is in the range from 0.02 to 1.5 weight %. Assuming that the average diameter of the silver particles is $D_1$ [nm] and that the average diameter of the wax particles is $D_2$ [nm], the relationship of $0.98 \leq D_2/D_1 \leq 5.40$ is satisfied.

14 Claims, 1 Drawing Sheet

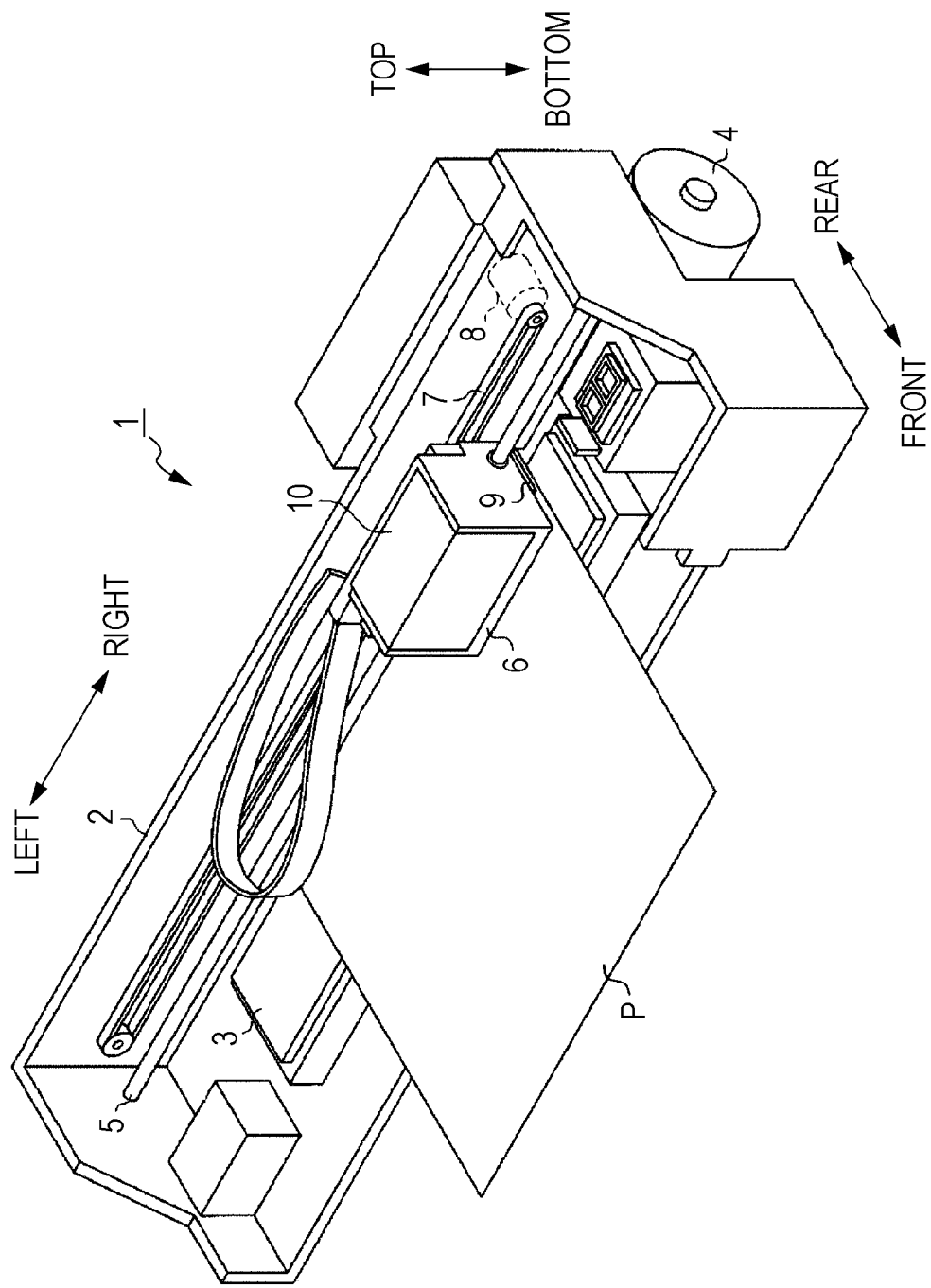

INK COMPOSITION AND PRINTED ARTICLE

Priority is claimed under 35 U.S.C. §119 to Japanese Application No. 2010-180866 filed on Aug. 12, 2010, which is hereby incorporated by reference in its entirety.

BACKGROUND

1. Technical Field

The present invention relates to an ink composition and a printed article.

2. Related Art

In ink jet printing, cyan, magenta, yellow, and black inks are typically used, thereby forming full-color images. In order to increase the quality of images to be formed, multiple ink colors are used (for example, in addition to the above four ink colors, six ink colors including light magenta and light cyan).

Unfortunately, a problem arises, in which the use of the multiple ink colors fails in providing sufficient metallic gloss.

In recent years, accordingly, an ink jet ink using metallic particles (metallic ink) has been proposed (see, JP-A-2007-297423, for example).

However, although use of the ink supposed in JP-A-2007-297423 enables relatively good metallic gloss to be provided, such an ink also causes disadvantages in which a printing surface is scratched with the result that a layer made of a material contained in the ink becomes bruised and is peeled. Such disadvantages result in the decreased gloss of formed images and the significant decrease of image quality. In the case of using color inks (pigment ink and dye ink) other than the metallic ink, such disadvantages are not normally generated.

SUMMARY

An advantage of some aspects of the invention is that it provides an ink composition which can be used to form an image having excellent metallic luster and excellent abrasion resistance (resistance to friction) and provides a printed article in which the image having excellent metallic luster and excellent abrasion resistance is formed.

Embodiments of the invention have the following inventiveness, thereby providing the above advantage.

According to a first aspect of the invention, there is provided an ink composition ejected by an ink jet technique, the ink composition containing: silver particles; wax particles; and water. The wax particles are contained in an amount that is in the range from 0.02 to 1.5 weight %. Assuming that the average diameter of the silver particles is $D_1$ [nm] and that the average diameter of the wax particles is $D_2$ [nm], the relationship of $0.98 \leq D_2/D_2 \leq 5.40$ is satisfied.

By virtue of such an ink composition, an ink composition which can be used to form an image having excellent metallic luster and excellent abrasion resistance can be provided.

In such an ink composition, it is preferable that the silver particles have an average diameter that is in the range from 5 to 100 nm.

By virtue of such an ink composition, images can be formed by using the ink composition so as to have especially excellent gloss (high-quality finish) and abrasion resistance. In addition, the ink composition can be ejected by an ink jet technique with especially excellent stability (accuracy of a landing position, stable ejection amount, or the like), and images having intended quality can be further steadily formed for long periods.

In such an ink composition, it is preferable that the wax particles each have a melting point of 100° C. or lower.

By virtue of such an ink composition, images can be formed by using the ink composition so as to have especially excellent abrasion resistance for further long periods.

In such an ink composition, it is preferable that the wax particles are formed by using paraffin-mixed wax.

By virtue of such an ink composition, images can be formed by using the ink composition so as to have especially excellent gloss (high-quality finish) and abrasion resistance. In addition, the ink composition can be ejected by an ink jet technique with especially excellent stability (accuracy of a landing position, stable ejection amount, or the like), and images having intended quality can be further steadily formed for long periods.

In such an ink composition, it is preferable that the silver particles are contained in an amount that is in the range from 0.5 to 30 weight %.

By virtue of such an ink composition, the ink composition can be ejected by an ink jet technique with especially excellent stability and can be preserved with especially excellent stability. Furthermore, in the case where a printing medium has been used to produce a printed article, excellent image quality and abrasion resistance can be provided even if a density range (content per unit area) of the silver particles on the printing medium broadly varies from a high level to a low level. Even if the printed article which has been produced by using the ink composition has a region in which the density of the silver particles varies, for example, the image quality of the printed article can be therefore enhanced.

It is preferable that such an ink composition further contains 1,2-hexanediol.

By virtue of such an ink composition, the silver particles can be dispersed in the ink composition with especially excellent stability, and the ink composition can be preserved with especially excellent stability and can be ejected with especially excellent stability. Furthermore, in the printed article produced by using the ink composition, the wax particles can be further sufficiently positioned between the silver particles, and the especially excellent abrasion resistance of the printed article can be therefore provided.

It is preferable that such an ink composition further contains trimethylolpropane.

By virtue of such an ink composition, the silver particles can be dispersed in the ink composition with especially excellent stability, and the ink composition can be preserved with especially excellent stability and can be ejected with especially excellent stability. Furthermore, in the printed article formed by using the ink composition, the wax particles can be further sufficiently positioned between the silver particles, and the especially excellent abrasion resistance of the printed article can be therefore provided.

According to a second aspect of the invention, there is provided a printed article which is produced as a result of applying the ink composition having any of the above inventiveness onto a recording medium by an ink jet technique.

In particular, a printed article in which an image having excellent metallic luster and excellent abrasion resistance is formed can be provided.

BRIEF DESCRIPTION OF THE DRAWINGS

The invention will be described with reference to the accompanying drawings, wherein like numbers reference like elements.

FIGURE is a perspective view schematically illustrating the configuration of an ink jet recording apparatus.

DESCRIPTION OF EXEMPLARY EMBODIMENTS

Preferred embodiments of the invention will be described in detail.

Ink Composition

The ink composition of embodiments of the invention is ejected by an ink jet technique.

Unlike ink compositions which are used in other printing techniques, droplets of such an ink composition are required to be ejected with sufficient stability. In the ink jet technique, the dispersion state of a material (dispersed material) which is dispersed in the ink composition has a large influence on the ejection properties of the ink composition. In the case where the dispersion state of the material (dispersed material) which is dispersed in the ink composition is significantly changed with time, problems which are not caused in other printing techniques may be therefore caused. In particular, the ink droplets may be ejected in an unstable amount with the result that intended images are less likely to be formed.

The ink composition of embodiments of the invention contains silver particles, wax particles (wax in the form of particles), and water. The ink composition contains wax particles in an amount that is in the range from 0.02 to 1.5 weight %. Assuming that the average diameter of the silver particles contained in the ink composition is $D_1$ [nm] and that the average diameter of the wax particles contained in the ink composition is $D_2$ [nm], the relationship of $0.98 \leq D_2/D_1 \leq 5.40$ is satisfied. The inventors have found the following: the wax particles are contained along with the silver particles in a predetermined amount such that a specific relationship between silver particle diameter and wax particle diameter is satisfied in this manner, so that images can be formed by using the ink composition so as to have excellent metallic luster and abrasion resistance.

Silver Particles

As described above, the ink composition of embodiments of the invention contains the silver particles. The ink composition contains the silver particles in this manner (particularly, the silver particles are contained together with the wax particles such that specific relationship is satisfied), thereby being able to form images having excellent metallic luster. Among various metals, the silver exhibits high whiteness, and the ink composition is therefore used in combination with various colors of inks, thereby being able to develop various metallic colors such as golden and copper-like colors.

The silver particles may have any average diameter which enables the specific relationship with the wax particles to be satisfied as described above. The silver particles have an average diameter that is preferably in the range from 5 to 100 nm, more preferably in the range from 20 to 65 nm. Within such ranges, images can be formed by using the ink composition so as to have especially excellent gloss (high-quality finish) and abrasion resistance. In addition, the ink composition can be ejected by an ink jet technique with especially excellent stability (accuracy of a landing position, stable ejection amount, or the like), and images having intended quality can be further steadily formed for long periods. The term "average diameter" as used herein refers to a volume-based average diameter unless otherwise noted. The average diameter can be measured with a particle size distribution analyzer based on a laser diffraction-scattering technique. Examples of such a particle size distribution analyzer utilizing the laser diffraction include a particle size distribution analyzer based on dynamic light scattering (for example, Microtrac UPA commercially available from NIKKISO CO., LTD.).

The silver particles are contained in the ink composition in an amount that is preferably in the range from 0.5 to 30 weight %, more preferably in the range from 5.0 to 15 weight %. Within such ranges, the ink composition can be ejected by an ink jet technique with especially excellent stability and can be preserved with especially excellent stability. Furthermore, in the case where a printing medium has been used to produce a printed article, excellent image quality and abrasion resistance can be provided even if a density range (content per unit area) of the silver particles on the printing medium broadly varies from a high level to a low level. Even if the printed article which has been produced by using the ink composition has a region in which the density of the silver particles varies, for example, the image quality of the printed article can be therefore enhanced.

The silver particles may be formed through any process. For example, a solution containing silver ions is prepared, and the silver ions are then reduced, thereby being able to desirably prepare the silver particles.

Wax Particles

The ink composition contains the wax particles.

As described above, the ink composition contains the wax particles in an amount that is in the range from 0.02 to 1.5 weight %. In the case where the amount of the wax particles falls below the lower limits of such ranges, excellent abrasion resistance cannot be sufficiently imparted to the printed article produced by using the ink composition. In contrast, in the case where the amount of the wax particles exceeds the upper limits of such ranges, excellent gloss cannot be sufficiently imparted to the printed article produced by using the ink composition.

The ink composition of embodiments of the invention contains the wax particles in an amount that is in the range from 0.02 to 1.5 weight % as described above, more preferably in the range from 0.04 to 1.0 weight %, further preferably in the range from 0.08 to 0.6 weight %. Within such ranges, the above advantageous effects can be further sufficiently provided.

As described above, assuming that the average diameter of the silver particles is $D_1$ [nm] and that the average diameter of the wax particles is $D_2$ [nm], the relationship of $0.98 \leq D_2/D_1 \leq 5.40$ is satisfied. In the case where the value of $D_2/D_1$ falls below the lower limit of the relationship, the wax particles which have entered spaces between the silver particles cannot be well exposed on a printing surface of the printed article produced by using the ink composition. A problem therefore arises, in which sufficient abrasion resistance cannot be provided. In contrast, in the case where the value of $D_2/D_1$ exceeds the upper limit of the relationship, the wax particles are less likely to enter spaces between the silver particles in the printed article produced by using the ink composition. Problems therefore arise, in which the silver particles are excessively exposed on a printing surface of the printed article with the result that the metallic luster of the printed article is reduced. Furthermore, in such a case, the wax particles prevent smooth arrangement of the silver particles, and a problem therefore arises, in which the metallic luster is reduced.

As described above, assuming that the average diameter of the silver particles is $D_1$ [nm] and that the average diameter of the wax particles is $D_2$ [nm], the relationship of $0.98 \leq D_2/D_1 \leq 5.40$ is satisfied, preferably $1.80 \leq D_2/D_1 \leq 3.86$, more preferably $1.80 \leq D_2/D_1 \leq 3.20$. Within such ranges, the above advantageous effects can be further sufficiently provided.

The wax particles contained in the ink composition preferably have an average diameter that is in the range from 8 to 120 nm, more preferably in the range from 20 to 100 nm, and further preferably in the range from 50 to 90 nm. Within such ranges, the above advantageous effects can be further sufficiently provided.

Assuming that the silver particle content is $X_{Ag}$ (weight %) and that the wax particle content is $X_{WAX}$ (weight %), the relationship of preferably $0.002 \leq X_{WAX}/X_{Ag} \leq 0.1$ is satisfied, more preferably $0.006 \leq X_{WAX}/X_{Ag} \leq 0.06$. Owing to satisfying such relationship, images can be formed by using the ink composition so as to sufficiently have excellent gloss (high-quality finish). Furthermore, in the printed article formed by using the ink composition, the wax particles can be further sufficiently positioned between the silver particles, and the printed article can be therefore produced so as to have especially excellent abrasion resistance.

Examples of the wax particles to be used include resin wax such as paraffin-mixed wax, oxidized high-density polyethylene, low-density polyethylene, polypropylene wax, polyethylene-based mixed wax, carnauba wax, and amide wax, and the paraffin-mixed wax is preferably used for the wax particles. Owing to such wax particles, images can be formed by using the ink composition so as to have especially excellent gloss (high-quality finish) and abrasion resistance. In addition, the ink composition can be ejected by an ink jet technique with especially excellent stability (accuracy of a landing position, stable ejection amount, or the like), and images having intended quality can be further steadily formed for long periods.

Examples of a commercially available wax particle-dispersed liquid (emulsion wax) include AQUACERs 507, 515, 531, 537, and 539; and CERAFLOURs 990 and 995 (each produced by BYK Japan KK).

The wax particles each have a melting point of preferably 100° C. or lower, more preferably in the range from 30° C. to 95° C., further preferably in the range from 50° C. to 95° C. In the case where the wax particles each have the melting point of 100° C. or lower, the wax particles themselves are easily softened, and the wax particles with good sliding properties are therefore provided, thereby contributing the increase of abrasion resistance. In contrast, the wax particles each having a melting point less than 30° C. have difficulty in maintaining its own crystal state at room temperature, and the wax particles may therefore flow out from the printed article after printing has been finished. Accordingly, the melting point of the wax particles falls within such ranges, so that images can be formed by using the ink composition so as to have especially excellent abrasion resistance for further long periods.

Water

The ink composition of embodiments of the invention contains water.

In the ink composition, the water mainly functions as a dispersion medium in which the silver particles and wax particles are dispersed. The water is contained in the ink composition, so that the silver particles and the likes can be dispersed with excellent stability. In addition, unwanted drying of the ink composition (evaporation of dispersion medium) can be prevented in the vicinity of the nozzles of a droplet ejection apparatus which will be hereinafter described, and the ink composition which has been applied onto a recording medium can be promptly dried. Intended images can be therefore desirably printed at high speed for long periods.

Although the amount of the water contained in the ink composition is not specifically limited, the water is contained in an amount that is preferably in the range from 20 to 80 weight %, more preferably in the range from 25 to 70 weight %.

Polyhydric Alcohol

The ink composition of embodiments of the invention preferably contains a polyhydric alcohol.

In the case where the ink composition of embodiments of the invention is applied to an ink jet printing apparatus, the polyhydric alcohol serves to prevent the ink composition from being dried, and the occurrence of clogging due to the dried ink composition is therefore prevented in the print head of the ink jet printing apparatus.

Examples of the polyhydric alcohol include ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, trimethylolpropane, 1,2-butanediol, 1,2-pentanediol, 1,2-hexanediol, 1,2-heptanediol, and 1,2-octanediol. Among these, alkanediol having four to eight carbon atoms is preferably employed, and alkanediol having six to eight carbon atoms is more preferably employed. Such polyhydric alcohol enables the permeability of the ink composition to a recording medium to be especially enhanced.

Although the amount of the polyhydric alcohol contained in the ink composition is not specifically limited, the polyhydric alcohol is contained in an amount that is preferably in the range from 0.1 to 20 weight %, more preferably in the range from 0.5 weight % to 10 weight %.

Among the above polyhydric alcohols, the ink composition preferably contains 1,2-hexanediol. Owing to use of 1,2-hexanediol, the silver particles can be dispersed in the ink composition with especially excellent stability, and the ink composition can be preserved with especially excellent stability and can be ejected with especially excellent stability. Furthermore, in the printed article produced by using the ink composition, the wax particles can be further sufficiently positioned between the silver particles, and the especially excellent abrasion resistance of the printed article can be therefore provided.

In the case where the ink composition contains 1,2-hexanediol, the ink composition contains 1,2-hexanediol in an amount that is preferably in the range from 0.2 to 10 weight %, more preferably in the range from 0.5 to 6.0 weight %. Within such ranges, the silver particles can be dispersed in the ink composition with further excellent stability, and the ink composition can be preserved with further excellent stability and can be ejected with further excellent stability. Furthermore, in the printed article produced by using the ink composition, the wax particles can be further sufficiently positioned between the silver particles, and the further excellent abrasion resistance of the printed article can be therefore provided.

Glycol Ether

The ink composition of embodiments of the invention preferably contains glycol ether. Glycol ether is contained with the result that wettability to the printing surface of a printing medium can be enhanced, thereby improving the permeability of the ink composition.

Examples of glycol ether include lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether. In particular, use of triethylene glycol monobutyl ether can contribute to providing good print quality.

Although the amount of glycol ether contained in the ink composition is not specifically limited, glycol ether is contained in an amount that is preferably in the range from 0.2 to 20 weight %, more preferably in the range from 0.3 to 10 weight %.

Surfactant

The ink composition of embodiments of the invention preferably contains an acetylene glycol-based surfactant or a polysiloxane-based surfactant. Use of the acetylene glycol-based or polysiloxane-based surfactant can serve to enhance the wettability to the printing surface of a recording medium, thereby improving the permeability of the ink composition.

Examples of the acetylene glycol-based surfactant include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. A commercially available acetylene glycol-based surfactant may be used, and examples of such a commercially available product include OLFINEs E1010, STG, and Y (each produced by Nissin Chemical Industry Co., Ltd.); and SURFYNOLs 104, 82, 465, 485, and TG (each produced by Air Products and Chemicals, Inc.).

A commercially available product may be used as the polysiloxane-based surfactant, and examples of such a commercially available product include BYK-347 and BYK-348 (produced by BYK Japan KK).

The ink composition of embodiments of the invention may contain other surfactants, such as an anionic surfactant, nonionic surfactant, and amphoteric surfactant.

Although the amount of the surfactant contained in the ink composition is not specifically limited, the surfactant is contained in an amount that is preferably in the range from 0.01 to 5.0 weight %, more preferably in the range from 0.1 to 0.5 weight %.

Other Components

The ink composition of embodiments of the invention may contain components other than the above components (other components). Examples of such other components include a pH adjuster, penetrant, organic binder, urea compound, drying inhibitor such as alkanolamine (triethanolamine or the like), and thiourea.

The ink composition preferably contains trimethylolpropane. Owing to use of trimethylolpropane, the silver particles can be dispersed in the ink composition with especially excellent stability, and the ink composition can be preserved with especially excellent stability and can be ejected with especially excellent stability. Furthermore, in the printed article produced by using the ink composition, the wax particles can be further sufficiently positioned between the silver particles, and the especially excellent abrasion resistance of the printed article can be therefore provided.

In the case where the ink composition contains trimethylolpropane, the ink composition contains trimethylolpropane in an amount that is preferably in the range from 3.0 to 20 weight %, more preferably in the range from 6.0 to 15 weight %. Within such ranges, the silver particles can be dispersed in the ink composition with further excellent stability, and the ink composition can be preserved with further excellent stability and can be ejected with further excellent stability. Furthermore, in the printed article produced by using the ink composition, the wax particles can be further sufficiently positioned between the silver particles, and the further excellent abrasion resistance of the printed article can be therefore provided.

In the case where the ink composition contains solids other than the silver particles and wax particles (hereinafter referred to as "other solids", where appropriate), the ink composition contains other solids in an amount of preferably 5 weight % or lower, more preferably 1 weight % or lower. Within such ranges, the effect which is provided by the silver particles and wax particles that are contained so as to satisfy the above relationship can be further sufficiently provided.

The ink composition contains solids in an amount of preferably 50 weight % or lower, more preferably in the range from 3.6 to 40 weight %, further preferably in the range from 12 to 27 weight %. Within such ranges, the ink composition can be ejected with especially excellent stability.

Although the viscosity of the ink composition is not specifically limited, the ink composition has a viscosity that is preferably in the range from 2.0 to 12.0 mPa·s, more preferably in the range from 3.0 to 5.0 mPa·s. Within such ranges, droplets of the ink composition can be ejected with excellent stability, unwanted spread of the ink composition which has landed on a recording medium can be further steadily prevented, and even images having fine structures can be desirably formed. The term "viscosity" as used herein refers to a viscosity which is measured by using a vibro-viscometer at a temperature of 25° C. in accordance with JIS Z8809, unless otherwise noted.

Printed Article

The printed article of embodiments of the invention can be produced as a result of applying the above ink composition onto a recording medium by an ink jet technique. The printed article in which an image having excellent metallic luster and abrasion resistance is formed can be therefore provided.

Examples of the printing medium onto which the ink composition is applied include sheets such as plain paper and specialty paper having an ink-receiving layer and include a substrate having a region including a surface onto which the ink composition is applied, the region being made from various types of plastic, ceramic, glass, and metallic materials or a composite material thereof.

Method for Producing Printed Article

FIGURE is a perspective view schematically illustrating the configuration of an ink jet recording apparatus (droplet ejection apparatus).

A method for producing the printed article of embodiments of the invention include a process for ejecting the above ink composition onto a recording medium with an ink jet recording apparatus (droplet ejection apparatus) illustrated in FIGURE (droplet ejection process).

Droplet Ejection Process

Droplet ejection using an ink jet printer 1 as the droplet ejection apparatus will be hereinafter described.

With reference to FIGURE, the ink jet printer 1 as the droplet ejection apparatus has a frame 2. A platen 3 is provided to the frame 2, and a paper feed motor 4 is driven to transport paper P onto the platen 3. A rod-like guide member 5 is provided to the frame 2 in parallel with the longer direction of the platen 3.

A carriage 6 is supported by the guide member 5 so as to be able to reciprocate in the axial direction of the guide member 5. The carriage 6 is connected to a carriage motor 8 through a timing belt 7 which is provided to the inside of the frame 2. The carriage motor 8 can be driven, thereby reciprocating the carriage 6 in parallel with the guide member 5.

The carriage 6 has a droplet ejection head 9, and an ink cartridge 10 is removably attached to the carriage 6, the ink cartridge 10 serving to supply ink as liquid to the droplet ejection head 9. The ink inside the ink cartridge 10 is supplied to the droplet ejection head 9 as a result of driving of a piezoelectric device (not illustrated) provided to the droplet ejection head 9. The ink is then ejected from a plurality of nozzles onto the printing medium (substrate) P transported onto the platen 3, the nozzles being formed on the nozzle-formed surface of the droplet ejection head 9.

In this manner, the printed article can be produced.

Heating Process

In the method for producing the printed article, a heating process may be performed in addition to the droplet ejection process, thereby heating the printing medium onto which the ink composition is applied.

Because the ink composition of embodiments of the invention contains water as a dispersion medium as described above, the ejected ink composition is immediately dried, and an additional drying process does not normally need to be performed after the ejection process. However, even if the printing medium P has a high water-holding property and the ink composition contains a low-volatile liquid component in a relatively high amount (for example, a case in which a liquid component having a boiling point of 160° C. or higher is contained in an amount of 3 weight % or larger), performance of the heating process effectively enables the liquid component of the ink composition to be prevented from remaining in the produced printed article. In addition, the printed article can be produced so as to have especially excellent durability and reliability. Furthermore, by virtue of performing the heating process, in a state in which the wax particles are positioned between the silver particles, partial fusion of the silver particles can be facilitated. Such partial fusion therefore synergistically acts together with the effect provided by the wax particles that are contained so as to satisfy the above specific relationship, and images (printed articles) can be formed by using the ink composition so as to have especially excellent abrasion resistance.

Although the preferred embodiments of the invention have been described above, embodiments of the invention are not limited to the above embodiments.

Although a typical case in which a colloidal liquid is used as the ink composition has been described, for example, the colloidal liquid may not be used.

Furthermore, although the piezoelectric technique is employed as the droplet ejection technique in the above embodiments, the droplet ejection technique is not limited to such a technique. In embodiments of the invention, for example, various known techniques can be employed, such as a technique in which ink is ejected by utilizing bubbles generated as a result of heating the ink.

Moreover, although the ink composition is ejected by the ink jet technique in the above embodiments, the ink composition may be applied to other printing techniques.

EXAMPLES

Examples of embodiments of the invention will be specifically described

1. Preparation of Ink Composition

Example 1

Polyvinylpyrrolidone (PVP, weight-average molecular weight: 10000) was heated at a temperature of 70° C. for 15 hours and was then cooled at room temperature. The PVP of 1000 g was then added to an ethylene glycol solution of 500 ml, thereby preparing a PVP solution. Ethylene glycol of 500 ml was put into another container, and silver nitrate of 128 g was then added. The resultant product was then sufficiently stirred with an electromagnetic stirrer, thereby preparing a silver nitrate solution. The silver nitrate solution was added to the PVP solution while the PVP solution was stirred with an overhead mixer at a temperature of 120° C. The resultant product was heated for approximately 80 minutes, thereby promoting a reaction. The resultant product was then cooled at room temperature. The produced solution was subjected to centrifugal separation with a centrifugal separator at a rate of 2200 rpm for 10 minutes. The separated silver particles were subsequently retrieved and were then added to an ethanol solution of 500 ml to remove excessive PVP. The resultant product was further subjected to the centrifugal separation, and the separated silver particles were then retrieved. The retrieved silver particles were subsequently dried with a vacuum drier at a temperature of 35° C. under a pressure of 1.3 Pa.

The silver particles produced as described above were mixed with 1,2-hexanediol, trimethylolpropane, OLFINE E1010 (commercially available from Nissin Chemical Industry Co., Ltd.) as a surfactant, AQUACER 539 (commercially available from BYK Japan KK) as wax (paraffin-mixed wax), and ion exchanged water in accordance with the composition listed in Table 1, thereby preparing an ink composition.

In this example, the average diameter of silver particles was measured with Microtrac UPA (commercially available from NIKKISO CO., LTD.), and measurement conditions were employed as follows: a refractive index was 0.2 to 3.9; the refractive index of a solvent (water) was 1.333; and the particles to be measured had spherical shapes.

Examples 2 to 13

The types and amounts of components to be used for preparing the ink composition were adjusted, thereby providing composition listed in Table 1. Except these, ink compositions were individually prepared in the manner the same as that in the example 1.

Comparison Examples 1 to 7

The types and amounts of components to be used for preparing the ink composition were adjusted, thereby providing composition listed in Table 1. Except these, ink compositions were individually prepared in the manner the same as that in the example 1.

In Table 1, the composition of the ink compositions of the examples and comparison examples are listed. Meanwhile, in Table 1, 1,2-hexanediol is represented as 1,2-HD, trimethylolpropane is represented as TMP, OLFINE E1010 (commercially available from Nissin Chemical Industry Co., Ltd.) is represented as E1010, the solid of AQUACER 539 (commercially available from BYK Japan KK, melting point of 90° C.) as wax (paraffin-mixed wax) is represented as AQ539, the solid of AQUACER 515 (commercially available from BYK Japan KK, melting point of 135° C.) as wax (oxidized high-density polyethylene) is represented as AQ515, the solid of AQUACER 531 (commercially available from BYK Japan KK, melting point of 130° C.) as wax (polyethylene-based mixed wax) is represented as AQ531, p-nonylphenoxypolyglycidol is represented as NPPG, the sodium salt of 2-mercaptobenzothiazole (discoloration inhibitor) is represented as SMBT, ammonium sulfate (pH adjuster) is represented as AS, an oxazoline group-containing aqueous polymer (binder resin) which contains an oxazoline group, as a side chain, at the main chain of an acrylic resin is represented as BR, glycerin is represented as GL, Proxel XL-2 is represented as XL-2, and diethylene glycol monobutyl ether is represented as S1. Furthermore, in each of the examples, the ink composition had a viscosity that was in the range from 5.0 mPa·s to 10.0 mPa·s (viscosity measured with a vibro-viscometer at a temperature of 25° C. in accordance with JIS Z8809).

TABLE 1

| | Silver colloidal particles | | Wax | | | 1,2-HD Content [weight %] | TMP Content [weight %] | E1010 Content [weight %] | NPPG Content [weight %] |
| | Content [weight %] | Average particle diameter $D_1$ [nm] | Type | Average particle diameter $D_2$ [nm] | Content [weight %] | | | | |
|---|---|---|---|---|---|---|---|---|---|
| Example 1 | 10.0 | 20 | AQ539 | 54 | 0.02 | 3.0 | 10.0 | 1.0 | — |
| Example 2 | 10.0 | 20 | AQ539 | 54 | 0.05 | 3.0 | 10.0 | 1.0 | — |
| Example 3 | 10.0 | 20 | AQ539 | 54 | 0.1 | 3.0 | 10.0 | 1.0 | — |
| Example 4 | 10.0 | 20 | AQ539 | 54 | 1.0 | 3.0 | 10.0 | 1.0 | — |
| Example 5 | 10.0 | 20 | AQ539 | 54 | 1.5 | 3.0 | 10.0 | 1.0 | — |
| Example 6 | 10.0 | 30 | AQ539 | 54 | 0.1 | 3.0 | 10.0 | 1.0 | — |
| Example 7 | 10.0 | 14 | AQ539 | 54 | 0.1 | 3.0 | 10.0 | 1.0 | — |
| Example 8 | 10.0 | 55 | AQ539 | 54 | 0.1 | 3.0 | 10.0 | 1.0 | — |
| Example 9 | 10.0 | 10 | AQ539 | 54 | 0.1 | 3.0 | 10.0 | 1.0 | — |
| Example 10 | 10.0 | 20 | AQ515 | 40 | 0.02 | 3.0 | 10.0 | 1.0 | — |
| Example 11 | 10.0 | 20 | AQ515 | 40 | 0.1 | 3.0 | 10.0 | 1.0 | — |
| Example 12 | 10.0 | 20 | AQ515 | 40 | 1.0 | 3.0 | 10.0 | 1.0 | — |
| Example 13 | 10.0 | 20 | AQ515 | 40 | 1.5 | 3.0 | 10.0 | 1.0 | — |
| Comparison example 1 | 10.0 | 20 | — | — | — | 3.0 | 10.0 | 1.0 | — |
| Comparison example 2 | 10.0 | 20 | AQ531 | 146 | 0.1 | 3.0 | 10.0 | 1.0 | — |
| Comparison example 3 | 10.0 | 78 | AQ539 | 54 | 0.1 | 3.0 | 10.0 | 1.0 | — |
| Comparison example 4 | 10.0 | 70 | AQ515 | 40 | 0.1 | 3.0 | 10.0 | 1.0 | — |
| Comparison example 5 | 10.0 | 20 | AQ539 | 54 | 0.01 | 3.0 | 10.0 | 1.0 | — |
| Comparison example 6 | 10.0 | 20 | AQ539 | 54 | 2.0 | 3.0 | 10.0 | 1.0 | — |
| Comparison example 7 | 10.0 | 20 | — | — | — | — | — | — | 0.2 |

| | SMBT Content [weight %] | AS Content [weight %] | BR Content [weight %] | GL Content [weight %] | XL-2 Content [weight %] | S1 Content [weight %] | Water Content [weight %] | $D_2/D_1$ |
|---|---|---|---|---|---|---|---|---|
| Example 1 | — | — | — | — | — | — | 75.98 | 2.70 |
| Example 2 | — | — | — | — | — | — | 75.95 | 2.70 |
| Example 3 | — | — | — | — | — | — | 75.9 | 2.70 |
| Example 4 | — | — | — | — | — | — | 75.0 | 2.70 |
| Example 5 | — | — | — | — | — | — | 74.5 | 2.70 |
| Example 6 | — | — | — | — | — | — | 75.9 | 1.80 |
| Example 7 | — | — | — | — | — | — | 75.9 | 3.86 |
| Example 8 | — | — | — | — | — | — | 75.9 | 0.98 |
| Example 9 | — | — | — | — | — | — | 75.9 | 5.40 |
| Example 10 | — | — | — | — | — | — | 75.98 | 2.00 |
| Example 11 | — | — | — | — | — | — | 75.9 | 2.00 |
| Example 12 | — | — | — | — | — | — | 75.0 | 2.00 |
| Example 13 | — | — | — | — | — | — | 74.5 | 2.00 |
| Comparison example 1 | — | — | — | — | — | — | 76.0 | — |
| Comparison example 2 | — | — | — | — | — | — | 75.9 | 7.30 |
| Comparison example 3 | — | — | — | — | — | — | 75.9 | 0.69 |
| Comparison example 4 | — | — | — | — | — | — | 75.9 | 0.57 |
| Comparison example 5 | — | — | — | — | — | — | 75.99 | 2.70 |
| Comparison example 6 | — | — | — | — | — | — | 74.0 | 2.70 |
| Comparison example 7 | 0.5 | 0.3 | 2.0 | 20.0 | 0.2 | 20.0 | 46.8 | — |

2. Production of Printed Article

Printed articles were individually produced as follows by using the ink compositions of the examples and comparison examples.

Ink jet specialty paper (photo paper) PGPP (commercially available from SEIKO EPSON CORPORATION) was prepared as a printing medium.

The droplet ejection apparatus illustrated in FIGURE was used to apply the ink composition onto a surface of the printing medium such that a certain pattern was formed at 40% duty, the surface having an ink-receiving layer. The printed article was produced in this manner. Meanwhile, the term "duty" as used herein refers to values obtained from the following formula.

duty (%)=number of actually printed dots/(longitudinal resolution×lateral resolution)×100 (in the formula, the term "number of actually printed dots" refers to number of actually printed dots per unit area, and the terms "longitudinal resolution" and "lateral resolution" each refer to resolution per unit area).

3. Evaluation 3.1. Gloss

A gloss meter (MINOLTA MULTI GLOSS 268 K-108382) was used to measure the gloss of the printing surfaces of the printed articles at a tilt angle of 80°, the printed articles being individually produced by using the ink compositions of the examples and comparison examples. The measurement results were then evaluated on the basis of the following criteria.

A: gloss was 125 or larger,
B: gloss was 121 or larger and less than 125,
C: gloss was 117 or larger and less than 121,
D: gloss was 113 or larger and less than 117,
E: gloss was 109 or larger and less than 113,
F: gloss was 105 or larger and less than 109, and
G: gloss was less than 105.

3.2. Abrasion Resistance

A Sutherland Rub Tester was used to analyze the abrasion resistance of the printed articles in accordance with JIS K5701 after the passage of 48 hours from the production thereof, the printed articles being individually produced by using the ink compositions of the examples and comparison examples. After the abrasion resistance analysis, the gloss (tilt angle of 60°) of the printed articles was also measured as in the manner the same as described in the part titled "3.1. Gloss". The decreasing rate of the gloss before and after the abrasion resistance analysis was obtained, and the results were then evaluated on the basis of the following criteria.

A: the decreasing rate of gloss was less than 10%,
B: the decreasing rate of gloss was 10% or larger and less than 15%,
C: the decreasing rate of gloss was 15% or larger and less than 20%,
D: the decreasing rate of gloss was 20% or larger and less than 25%,
E: the decreasing rate of gloss was 25% or larger and less than 30%,
F: the decreasing rate of gloss was 30% or larger and less than 35%, and
G: the decreasing rate of gloss was 35% or larger and less than 50%.

Measurement results were listed in Table 2.

TABLE 2

|  | Gloss | Abrasion resistance |
|---|---|---|
| Example 1 | A | C |
| Example 2 | A | B |
| Example 3 | A | A |
| Example 4 | B | A |
| Example 5 | C | A |
| Example 6 | A | A |
| Example 7 | B | A |
| Example 8 | A | C |
| Example 9 | C | A |
| Example 10 | A | C |
| Example 11 | A | B |
| Example 12 | B | A |
| Example 13 | C | A |
| Comparison example 1 | A | F |
| Comparison example 2 | D | A |
| Comparison example 3 | A | D |
| Comparison example 4 | A | E |
| Comparison example 5 | A | D |
| Comparison example 6 | D | A |
| Comparison example 7 | B | F |

As is obvious from Table 2, although the printed articles of embodiments of the invention had excellent gloss and abrasion resistance, the printed articles of the comparison examples had insufficient gloss and abrasion resistance. Among the examples, the printed articles in which the paraffin-mixed wax had been used were especially excellent.

Furthermore, the ink composition of embodiments of the invention enabled excellent ejection stability of ink droplets to be provided and was preserved with excellent stability. In addition, the ink composition of embodiments of the invention enabled the ink droplets to be steadily ejected for long periods and could be therefore desirably used for producing the printed article. In contrast, the ink compositions of the comparison examples 2 and 5 had insufficient ejection stability of ink droplets and insufficient preservation stability. Fine printing patterns could not be therefore accurately formed, and droplets of such ink compositions were ejected in a significantly unstable manner after such ink compositions had been preserved for long periods.

What is claimed is:

1. An ink composition ejected by an ink jet technique, the ink composition comprising:
   silver particles;
   wax particles; and
   water, wherein
   the wax particles are contained in an amount that is in the range from 0.02 to 1.5 weight %, and
   assuming that the average diameter of the silver particles is $D_1$ [nm] and that the average diameter of the wax particles is $D_2$ [nm], the relationship of $0.98 \leq D_2/D_1 \leq 5.40$ is satisfied.

2. The ink composition according to claim 1, wherein the silver particles have an average particle diameter that is in the range from 5 to 100 nm.

3. The ink composition according to claim 1, wherein the wax particles have a melting point not exceeding 100° C.

4. The ink composition according to claim 1, wherein the wax particles are formed by using paraffin-mixed wax.

5. The ink composition according to claim 1, wherein the silver particles are contained in an amount that is in the range from 0.5 to 30 weight %.

6. The ink composition according to claim 1, further comprising 1,2-hexanediol.

7. The ink composition according to claim 1, further comprising trimethylolpropane.

8. A printed article which is produced as a result of applying the ink composition of claim 1 onto a recording medium by an ink jet technique.

9. A printed article which is produced as a result of applying the ink composition of claim 2 onto a recording medium by an ink jet technique.

10. A printed article which is produced as a result of applying the ink composition of claim 3 onto a recording medium by an ink jet technique.

11. A printed article which is produced as a result of applying the ink composition of claim 4 onto a recording medium by an ink jet technique.

12. A printed article which is produced as a result of applying the ink composition of claim 5 onto a recording medium by an ink jet technique.

13. A printed article which is produced as a result of applying the ink composition of claim 6 onto a recording medium by an ink jet technique.

14. A printed article which is produced as a result of applying the ink composition of claim 7 onto a recording medium by an ink jet technique.

* * * * *